Dec. 5, 1933.          H. C. LORD          1,937,581
                    VIBRATION DAMPENER
                    Filed Nov. 18, 1929

INVENTOR.
Hugh C. Lord

Patented Dec. 5, 1933

1,937,581

UNITED STATES PATENT OFFICE 1,937,581

VIBRATION DAMPENER

Hugh C. Lord, Erie, Pa.

Application November 18, 1929
Serial No. 407,972

17 Claims. (Cl. 248—14.2)

Periodic vibrations in running machinery create objectionable noise and sensations. A very slight vibration is quite noticeable. In order to dampen such vibrations it is necessary to permit a limited freedom of movement of the apparatus subjected to such vibration. The difficulty encountered with many devices which are subjected not only to vibrations incident to the operation of the device, but also shocks and loads, is to give to the device, or mounting sufficient stability to take care of the load and running conditions subject to such external shocks without largely neutralizing the freedom necessary for dampening effect. I have heretofore disclosed in application, Serial Number 220,156 filed September 17, 1927 (Patent No. 1,830,118, November 3, 1931) a mounting adapted to dampen vibrations and also to abruptly increase the resistance to movement beyond the vibration range. Under some conditions, it is desirable not only to limit the excess movement in opposite directions, but also in directions transverse to other directions. The present invention is designed, therefore, to give the very small freedom of movement necessary to take care of vibrations and to abruptly increase the resistance to movement in excess of this in different directions. It is also under certain conditions desirable to provide the mounting with a bottoming face which is within the walls of the mounting so that it may be housed by the walls of the mounting and simplify the relative members of the mounting. Features and details of the invention will appear from the specification and claims.

A preferred embodiment of the invention is illustrated in the accompanying drawing as follows:—

Figure 1:
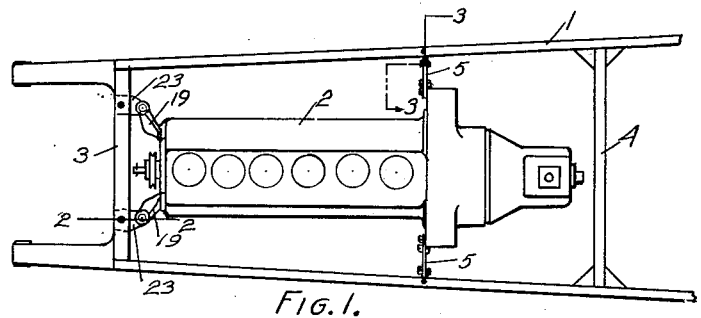

Fig. 1 shows a plan view of an automobile frame and engine mounted therein.

Figure 2:
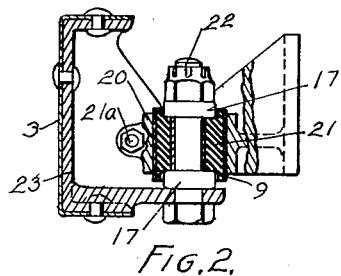

Fig. 2 a section on the line 2—2 in Fig. 1.

Figure 3:
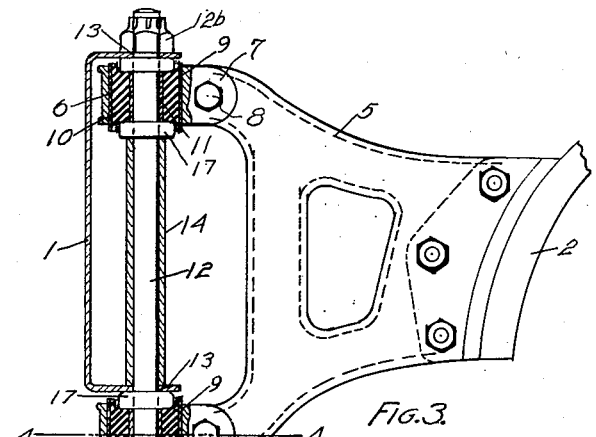

Fig. 3 a section on the line 3—3 in Fig. 1.

Figure 4:
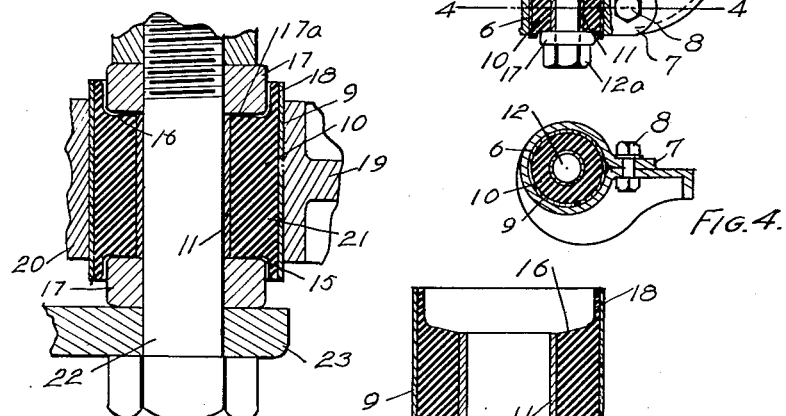

Fig. 4 a section on the line 4—4 in Fig. 3.

Figures 5, 6:
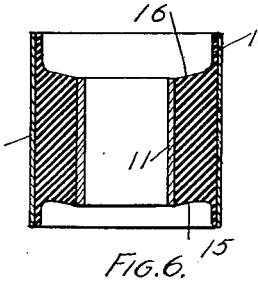

Fig. 5 an enlarged view in section of one of the mounting connections.

Fig. 6 an enlarged view of a detached unit.

1 marks an automobile frame, 2 an internal combustion engine mounted therein, 3 a front cross member of the frame, and 4 an intermediate member. This may be of the usual and ordinary construction.

Arms 5 extend from the rear of the engine and these arms have forked ends terminating in cylindrical clamping walls 6, these walls terminating in lips 7 through which bolts 8 extend for drawing the walls into clamping position.

The resilient mounting unit comprises a shell 9 which is clamped by the wall 6, a rubber wall 10, and an inner hollow pin 11. The rubber is secured through face engagement with the interior surface of the shell 9 and exterior surface of the pin 11 and is preferably secured thereto by surface bonding which is also preferably accomplished during vulcanization. Where this is accomplished during vulcanization in which heat is used the rubber in cooling shrinks and places the rubber in radial tension between the shell 9 and the pin 11. These units are preferably arranged with a vertical axis and the load is, therefore, sustained through the shear and tension of the rubber. This gives the most desirable vibration and absorption quality to the rubber.

One of these mounting units is arranged in each fork of the arm 5 and a bolt 12 extends through openings 13 in the flanges of the frame side 1. This bolt extends through the sleeves 11 at each end and has a bolt head 12a and a nut 12b. This bolt holds the mountings in place and clamps the whole job together. A distance piece 14 is arranged between the flanges of the side frame 1 and opposes the thrust due to the clamping action of the bolt.

The end faces of the rubber are designed with particular reference to the load and to the abruptness with which it is desired to stop any movement beyond the vibration range. The lower end has a face 15 which is inclined initially slightly backward from the pin, or sleeve, while the upper face 16 is initially inclined in the opposite direction. Plugs 17 are arranged on the bolt 12 and are clamped at opposite ends of the sleeve 11. The plugs have faces 17a which are designed to engage the rubber faces 15 and 16. When the weight of the engine is placed on the mounting it takes up some of the inclination 15 and produces a greater inclination in the face 16. The ultimate result should be to give a practically similar relation between the faces 15 and 16 and the faces 17a of the plugs 17. If a comparatively larger amount of movement is unobjectionable the inclination of the faces 15 and 16 in their final position, as illustrated in Fig. 5, may be quite pronounced, but ordinarily the inclination would be such that in the position shown in Fig. 5 there would be an actual initial contact between the faces 17a and the faces 15 and 16 and with the rubber very nearly in neutral so far as compression is concerned at these points of contact and simply be ready with any slight movement to be further compressed and thus stop the movement, the rubber in neutral interfering but little, if any, with the free action in absorbing vibration.

The quickness in which the snubbing, or stopping of end movement is accomplished is also controlled to quite a large extent by the comparative diameter of the plugs 17 and the interior diameter of the shell 9. These plugs ordinarily will have a diameter closely approaching the shell 9. It will be seen that in the ordinary vibration range the load is actually carried by the rubber in shear and in tension and with a span extending from the wall 9 to the sleeve 11, but with any movement beyond this, the face of the plug 17 engaging the rubber immediately adjacent to the shell reduces this span in effect to substantially the distance between the periphery of the plug and the shell so that there is a very abrupt and pronounced increase in resistance.

It is also desirable in many installations to dampen, or restrict the transverse movement. In an automobile engine there is very little forward and back vibration and it may be possible to balance the reciprocating parts of the engine within fairly close limits. But rotative parts, such as are included ordinarily in clutches and their mechanisms, give difficulty in continued balanced conditions and consequently a vibration is set up not only vertically but sidewise. In the present invention this sidewise tendency to vibration is resisted through the tension of the rubber between the inner and outer sides of the joint and somewhat in shear on the front and rear sides of the mounting, or joint, but if the wall of rubber is made soft enough to really absorb the vibrations it is liable to be so soft as to develop too great a movement under accumulations of vibration, or thrust. In the present invention this added resistance is accomplished by providing a comparatively thin wall of rubber 18 along the shell 9 forming an extension from the main body of rubber. The peripheries of the plugs 17 are brought very close to this, in fact, if it is desired to confine movement within very close limits it may be actually in contact, but leaving the rubber of the wall practically in neutral so as not to disturb the free vibration movement. The thickness of the wall is such, however, that with very little movement in any direction it is immediately checked by the compression of the rubber forming this extension. This extension is also desirable in another respect in that with an excess of endwise movement the strain communicated by the outer periphery of the face 17a on the face 15, or 16 is very largely localized so far as the bond between the rubber and the shell is concerned. The extension 18 places the end of this bond away from this localized strain and, therefore, re-enforces it over what it would be if this strain were at the edge of the shell.

A similar mounting is used at the front. The engine frame is provided with arms 19 which have clamping sleeves 20 provided with clamping bolts 21a, these clamp a mounting 21 similar to that heretofore described in connection with the rear support of the engine. A bolt 22 extends through a bracket 23 secured to the cross member 3 and through the sleeve of the mounting and is provided with a nut 24 at its upper end. The mounting is provided with the plugs 17 which are clamped in place by the bolt 22.

It will be noted that the bottoming faces are within the walls of the mounting and thus definitely housed and provide convenient supports against which the bottoms operate. It will also be noted that these bottoming faces are short of the ends of the outer wall, that is, do not extend axially to the outer wall. While I have shown the central member directly opposite the outer member the important feature is that it be within the projected area so as to place the rubber in shear. I have also shown the supporting member as the inner member and the supported member as the outer member, but I do not wish to be limited to this arrangement.

What I claim as new is:—

1. In a vibration dampener, the combination of a supported member; a supporting member, one of said members being subjected to periodic vibrations; and a resilient element interposed between the said members and having a comparatively small resistance to movement between the members for a limited vibration range in a diversity of directions, one transversely to the other, said element and one of the members having portions cooperating to produce a high rate of increase in resistance as compared with the rate of increase in the vibration range and interposing a greater resistance to relative movement of the members in said directions beyond the vibration range.

2. In a vibration dampener, the combination of a supported member; a supporting member, one of said members being within the projected area of the opposite sides of the other of said members; and an element forming a rubber connection between the members and secured with face engagement at its edges to the opposite sides and to the intermediate member, said element resisting vibration movement through the vibration range in a diversity of directions, one transverse to the other and in one of which the rubber is in shear, said element and one of the members having portions cooperating to produce a greater resistance to movement beyond the vibration range in said directions.

3. A dampening member between a supported and a supporting member, one of said members being annular and the other member arranged within the projected area of the annular member; and an element forming a rubber wall interposed between said supported and supporting members, said element giving comparative freedom of movement through a vibration range in a diversity of directions, one transverse to the other, and said element and one of the members having portions cooperating to produce an increase in the rate of resistance beyond a limited range in said directions.

4. In a vibration dampener, the combination of a supported member; a supporting member, one of said members being annular and the other of said members being arranged within the projected area of the annular member; and an element forming a rubber connection interposed between said members secured to the faces of said members by surface bonding and being under initial tension, said means interposing a low rate of increase to resistance through the vibration range in diverse directions, one transverse to the other, said element and one of the members having portions cooperating to produce an increase in the rate of resistance beyond said range in said directions.

5. In a dampener, the combination of a supported member; a supporting member; and an element forming a rubber connection interposed between said members carrying the supported member in suspension and with a small rate in increase to movement in a diversity of directions, one transverse to the other through a limited vibration range and said element and one of the members having portions cooperating to produce an increase in the rate of resistance in said directions beyond such range.

6. In a dampener, the combination of a supporting member; a supported member, one of said members being annular and with vertical walls and the other member arranged within the projected area of the annular walls; and an element forming a rubber connection interposed between said members and secured therebetween and carrying the load in shear and interposing a small rate of increase in resistance to movement through a limited vibration range in a diversity of directions, one transverse to the other, said element and one of the members having portions cooperating to produce an increase in the rate of resistance beyond such vibration range in said directions.

7. A joint comprising an outer annular member; a central member; and a rubber wall interposed and forming a connection between said members, said wall having an axial extension along one of the members and the other member having a portion with initially free transverse movement relative to said extension and engaging said axial extension to limit transverse movement.

8. A joint comprising an outer annular member; a central member; and a rubber wall interposed between and bonded to said members and said joint having means for reducing the liability of breaking the bond comprising an axial extension along the outer member.

9. A joint comprising an outer annular member; a central member; and a rubber wall interposed and forming a connection between the members, said rubber having an axial extension along the inner surface of the outer member the central member having portions with initially free movement relative to the extension and engaging the extension to limit its movement.

10. A joint having an outer annular member; an inner member; and a rubber wall between the members, said wall having an inclined end, the outer member extending beyond the inclined end and provided with a rubber wall along its inner periphery.

11. A joint having an outer annular member; an inner member; and a rubber wall between the members, said wall having inclined ends, the outer member extending beyond the inclined ends and provided with a rubber wall along its inner periphery.

12. In a joint, the combination of two members, one of said members having opposingly faced walls and the other having a portion within the projected area between the walls; and a recessed rubber connection between the members and so disposed to sustain a load by shear stress of the rubber, one of said members having a portion extending into the recess of the rubber connection and spaced from the walls thereof so as to afford a free initial movement between the members through a shear stress of the rubber and cooperating with the walls of the recess to increase the resistance to movement between the members upon contact therewith.

13. In a joint, the combination of a member having opposing wall portions substantially undeformed under normal load; comparatively flexible rubber means having portions in load-carrying relation having union with and projecting angularly from the opposing wall portions and disposed a substantial distance from the ends of the opposed wall portions at one end of the joint and adapted to receive the major portion of the normal load thrust in shear, said rubber means having a bottoming surface crosswise of the opposing wall portions; and a companion joint member secured to the rubber means within the projected area between the opposing wall portions, the companion member being disposed to and acting on the bottoming surface to increase the resistance to movement of the joint as the load is increased.

14. In a joint, the combination of a member having opposing wall portions substantially undeformed under normal load; comparatively flexible rubber means having portions in load-carrying relation having union with and projecting from the opposing wall portions in arch formation, the concave side of the arch extending a distance from the ends of the opposed wall portions within the wall portions at one end of the joint, said arch-shaped rubber means being adapted to receive the major portion of the normal load thrust in shear and having a bottoming surface crosswise of the opposing wall portions; and a companion joint member carried by the projecting arch-shaped rubber means in spaced relation from the wall portions and adapted to engage the bottoming surface to increase the resistance to movement of the joint as the load is increased.

15. In a joint, the combination of an annular wall substantially undeformed under normal load; comparatively flexible rubber means having portions in load-carrying relation having union with and projecting from the opposing wall portions in dome-shaped formation, the concave side of the dome extending a distance from one edge of the wall within the annular wall at one end of the joint, said dome-shaped means being adapted to receive the major portion of the normal load thrust in shear and having a bottoming surface crosswise of the opposing wall portions; and a companion joint member carried by the projecting dome-shaped rubber means in spaced relation from the wall and adapted to engage the bottoming surface to increase the resistance to movement of the joint as the load is increased.

16. In a joint, the combination of a member having opposing wall portions substantially undeformed under normal load; comparatively flexible rubber means having portions in load-carrying relation having union with and projecting from the opposing wall portions in arch formation, the concave side of the arch extending a distance from the ends of the opposed wall portions within the wall portions at one end of the joint, said arch-shaped rubber means being adapted to receive the major portion of the normal load thrust in shear and having a bottoming surface crosswise of the opposing wall portions; and a companion joint member carried by the projecting arch-shaped rubber means in spaced relation from the wall portions and adapted to initially engage a portion of the bottoming surface to increase the resistance to movement of the joint and vary its characteristics.

17. In a joint, the combination of an annular wall substantially undeformed under normal load; comparatively flexible rubber means having portions in load-carrying relation having union with and projecting from the opposing wall portions in dome-shaped formation, the concave side of the dome extending a distance from one edge of the wall within the annular wall at one end of the joint, said dome-shaped means being adapted to receive the major portion of the normal load thrust in shear and having a bottoming surface crosswise of the opposing wall portions; and a companion joint member carried by the projecting dome-shaped rubber means in spaced relation from the wall and adapted to engage a portion of the bottoming surface to increase the resistance to movement of the joint to vary its characteristics.

HUGH C. LORD.